OR 3,145,247

SEARCH ROOM

Aug. 18, 1964 R. J. MELTZER 3,145,247

FIBER OPTICS CRYPTOGRAPHIC DEVICE

Filed Oct. 7, 1960

INVENTOR.
ROBERT J. MELTZER
BY Hoffman Stone
Frank C. Parker
David E. Dougherty
ATTORNEYS & AGENT United States Patent Office 3,145,247

Patented Aug. 18, 1964

3,145,247

FIBER OPTICS CRYPTOGRAPHIC DEVICE

Robert J. Meltzer, Irondequoit, N.Y., assignor to Bausch & Lomb Incorporated, Rochester, N.Y., a corporation of New York Filed Oct. 7, 1960, Ser. No. 61,188
2 Claims. (Cl. 88—1)

This invention relates to novel cryptographic devices of the type based on and utilizing bundles of optical fibers, and, more particularly, to devices of this type including so-called coherent bundles of optical fibers.

The cryptographic device of the present invention is expected to be particularly useful in commerical fields such as banking and credit wherein substantial economies and improved efficiency may be realized by having each bank depositor or person to whom credit is extended carry his own identification card bearing his personal signature or other identifying subject matter. In those instances where this is presently done, the signature or other matter appears in clear text, with a resultant risk of forgery in the event the card is lost and then found by an unscrupulous person. It is understood that personal credit companies have experienced substantial losses in this way. There is, accordingly, a relatively large potential demand for a cryptographic system which permits the identifying subject matter to be placed on personal identification cards in cryptographic form so as to be substantially meaningless to a casual finder. The cryptogram should also be readily decipherable for comparison with a signature made by the person presenting the card at the time of its presentation. Banks, particularly savings banks, have indicated a desire to adopt such a system, placing personal signature cryptograms on their savings account passbooks, thereby permitting their tellers to make instantaneous signature comparisons without the need to leave their cages to consult a central file of signature cards.

The device of the present invention is, of course, not limited to such use but may also be applied in many other fields, and for other purposes, wherever an optical cryptographic device has application. Devices according to the invention may be easily produced by mass production techniques at relatively low cost. They are readily adaptable to the use of cryptographic keying techniques so that several different cipher keys may be used within a single system, thereby enabling the achievement of a relatively high degree of cryptographic security.

A representative embodiment of the invention will now be described in detail in conjunction with the accompanying drawing, in which.

Figure 1:
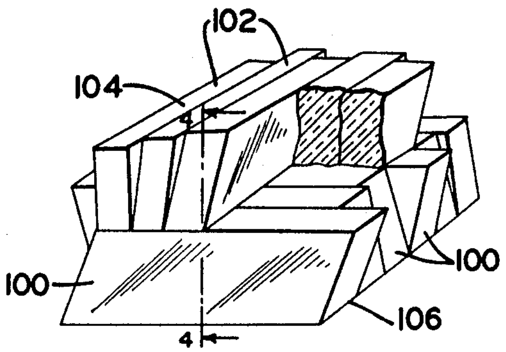
FIG. 1 is a fragmentary, perspective view of an optical cryptographic device according to the invention including a composite array of coherent bundles of optical fibers.
Figure 2:
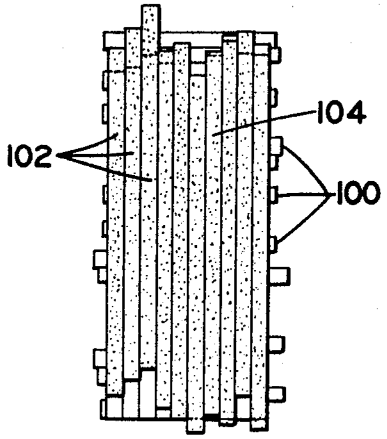
FIG. 2 is a plan view of the device shown in FIG. 1.
Figure 3:
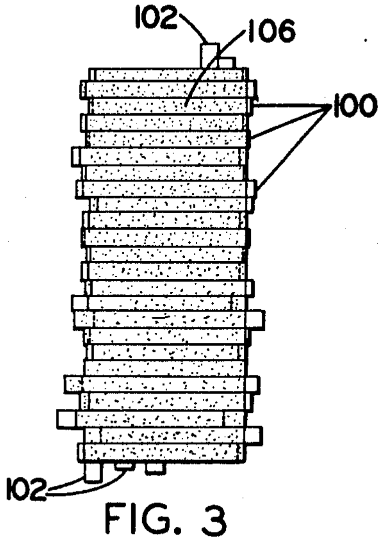
FIG. 3 is a bottom view of the device shown in FIG. 1.
Figure 4:
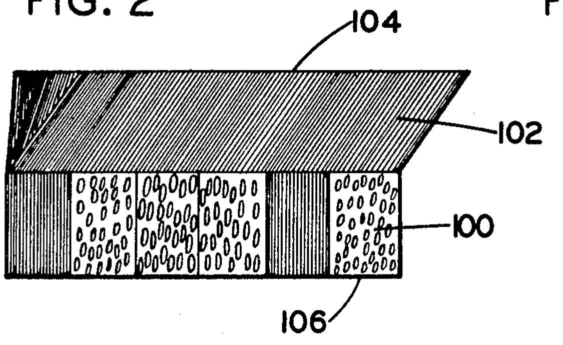
FIG. 4 is a sectional view taken along the line 4—4 of FIG. 1.

An optical cryptographic device according to the present invention includes an image dissector constituted by an array of coherent bundles of optical fibers. Heretofore optical ciphering has been proposed based upon random, or "pseudo random" bundles of optical fibers, in which the individual fibers are differently oriented relative to each other at opposite ends of the bundles. Manufacture of such random, or "pseudo random" bundles is a relatively difficult matter when it is desired to reproduce the identical random pattern in successive different bundles. According to the invention, coherent bundles are used, which are relatively easily manufactured. The bundles are arranged in an array with the fibers of each bundle angularly offset relative to the fibers in other adjacent bundles. A cryptogram is formed by passing light through the bundles from an object surface to an image surface. The devices are relatively inexpensive to manufacture, yet highly efficient in operation, and rugged and long-lasting in service.

An illustrative fiber optics cryptographic device is shown in the drawing, and includes a close packed, composite, two layer array of relatively thin, coherent bundles 100 and 102 of optical fibers arranged with their entrant and exit surfaces in common respective planes. The individual bundles 100 and 102 may be of any desired size, or sizes depending upon the nature of the material to be enciphered and deciphered. Typically, for use in enciphering and deciphering personal signatures, the fiber bundles 100 and 102 may be about one-tenth inch thick, the thickness being taken in a direction transverse to the length of the individual fibers, and about three eighths inch long, their length being taken in the direction of the length of the individual fibers. The entire array covers an area of about three-quarters of an inch by about three inches, and the width of each bundle 100 and 102 is about three-quarters of an inch or three inches, depending upon its position in the array.

As shown, the array is divided into upper and lower layers. The bundles 100 in the lower layer of the array are about three-quarters of an inch wide, and are arranged with their widths parallel to the width of the overall area covered by the array. The bundles 102 in the upper layer of the array are about three inches wide and are transverse to the bundles 100 in the lower layer. The fibers of each one of the bundles 100 and 102 are angularly offset from the fibers of the immediately adjacent bundles.

Enciphering and deciphering are accomplished by transmitting light through the array between its top surface 104 and its bottom surface 106, the clear text being on one of the surfaces and the cryptogram upon the other. In this arrangement, the various image portions transmitted by the different respective fibers are translated laterally relatively to each other as they pass through the array thereby producing at the exit surface a scrambled, or enciphered image of the entrant surface.

The individual elements 100 and 102 of the array may be made by slicing an elongated ribbon-like, coherent fiber bundle (not shown) along diagonal lines. The array is then formed by arranging the bundle 100 and 102 with their entrant and exit faces in common respective planes. Any desired means (not shown) may be provided for mounting the array and holding the bundles 100 and 102 securely together.

The fiber bundles 100 and 102 are preferably composed of compound fibers, each individual fiber consisting of a core of relatively high refractive index glass, and an outer sheath, or coating of relatively low index glass. In a construction of this kind, the fibers may be fused together to bond the individual fibers rigidly in place within each bundle without danger of "cross talk" between adjacent ones of the fibers. In addition, all of the individual bundles 100 in the lower layer of the array may be fused together, and also the individual bundles 102 in the upper layer of the array. The practice of the invention also contemplates the use of single layer fiber bundle arrays, and of arrays having more than two layers, and of arrays in which the bundles of different layers are arranged at other than right angles to each other. The sizes of the individual fibers are selected in view of the nature of the subject matter to be enciphered and deciphered, and the optical resolution desired in operation.

The entrant and exit faces 104 and 106 in the embodiment illustrated are arranged in common respective planes as a matter of convenience, both in manufacture and in use. It is also possible to produce similar devices in which the entrant and exit faces of the different bundles are in staggered arrangement and offset by various different distances from the common respective planes. In such instances, the subject matter to be enciphered or deciphered is imaged upon or from the entrant or exit faces, respectively, by an objective lens, or other optical imaging means which has sufficient depth of focus to include the faces of all of the bundles upon which or from which the subject matter is to be imaged.

What is claimed is:

1. A cryptographic device comprising a first close packed array including angularly displaced coherent bundles, each of said bundles including a cohesive plurality of generally parallel image forming optical fibers which are parallel with respect to each other, the entrant and exit faces of a plurality of said bundles so constructed and arranged that the axis of light transmission through each bundle is angularly offset with respect to the axis of light transmission of the adjacent bundle and angularly related to the entrant and exit faces of said bundles by an angle different than 90°, and a second array of angularly displaced coherent bundles including a cohesive plurality of generally parallel image forming optical fibers which are parallel with respect to each other, the entrant and exit faces of a plurality of said bundles in said second array so constructed and arranged that the axis of light transmission through each bundle is angularly offset with respect to the axis of light transmission of the adjacent bundle and angularly related to the entrant and exit faces of said bundles by an angle different than 90°, the entrant faces of said bundles in said first array disposed operatively adjacent and angularly oriented with respect to the exit faces of said members in said second array to thereby form plural layers optically in series.

2. A cryptographic device comprising a first close packed array including angularly displaced coherent bundles, each of said bundles defining a planar sheet including a plurality of generally parallel optical fibers which are parallel with respect to each other, the entrant and exit faces of a plurality of said bundles so constructed and arranged that the axis of light transmission through each bundle is angularly offset with respect to the axis of light transmission of the adjacent bundle and angularly related to the entrant and exit faces of said bundles by an angle different than 90°, and a major lateral surface of a sheet longitudinally engaging a major lateral surface of an adjacent sheet to thereby form a stacked order, and a second close packed array including angularly displaced coherent bundles, each of said bundles in said second array defining a planar sheet including a plurality of generally parallel cohesive optical fibers which are parallel with respect to each other, the entrant and exit faces of a plurality of said bundles in said second array so constructed and arranged that the axis of light transmission through each bundle is angularly offset with respect to the axis of light transmission of the adjacent bundle and angularly related to the entrant and exit faces of said bundles by an angle different than 90°, and a major lateral surface of a sheet longitudinally engaging a major lateral surface of an adjacent sheet to thereby form a stacked order, and said first array superposed on said second array with the entrant faces of said bundles of said first array disposed operatively adjacent and angularly oriented with respect to the exit faces of said bundles in said second array and with the planar sheets of said first array angularly disposed with respect to the planar sheets of said second array.

References Cited in the file of this patent

FOREIGN PATENTS 780,976 Great Britain ---------- Aug. 14, 1957

OTHER REFERENCES

Strong: Concept of Classical Optics, published by W. H. Freeman and Co. Inc., 1958, pp. 562–565 relied on.